United States Patent
Aoki

(10) Patent No.: US 9,110,264 B2
(45) Date of Patent: Aug. 18, 2015

(54) OPTICAL MODULE

(71) Applicant: Fujitsu Optical Components Limited, Kawasaki-shi, Kanagawa (JP)

(72) Inventor: Shinichi Aoki, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/078,835

(22) Filed: Nov. 13, 2013

(65) Prior Publication Data

US 2014/0161408 A1    Jun. 12, 2014

(30) Foreign Application Priority Data

Dec. 6, 2012    (JP) ................. 2012-267147

(51) Int. Cl.
*G02B 6/42*    (2006.01)

(52) U.S. Cl.
CPC .............. *G02B 6/4269* (2013.01); *G02B 6/428* (2013.01)

(58) Field of Classification Search
CPC .............................. G02B 6/4269; G02B 6/428
See application file for complete search history.

(56) References Cited

U.S. PATENT DOCUMENTS

| 5,043,845 A | 8/1991 | McDermott et al. |
| 6,917,482 B2 * | 7/2005 | Minamino et al. ............. 359/819 |
| 2011/0121703 A1 * | 5/2011 | Karlicek et al. ................ 313/46 |
| 2011/0133236 A1 * | 6/2011 | Nozaki et al. ................... 257/98 |
| 2012/0147625 A1 * | 6/2012 | Yang et al. .................... 362/612 |

FOREIGN PATENT DOCUMENTS

| JP | 4-502385 | 4/1992 |
| JP | 7-30223 | 1/1995 |
| JP | 2007-19130 | 1/2007 |
| JP | 2007-115868 | 5/2007 |

* cited by examiner

*Primary Examiner* — Omar R Rojas
(74) *Attorney, Agent, or Firm* — Staas & Halsey LLP

(57) ABSTRACT

An optical module includes a wiring board on which a first opening and a second opening are provided having, between the first and second openings, a traversing portion on which a signal wire is arranged, an optical component that is mounted on a first plane side of the first opening and the second opening of the wiring board and that generates heat, a heat sink arranged on a second plane side, which is on a reverse of the first plane side, of the first opening and the second opening of the wiring board, and an anisotropic heat dissipation sheet that is provided between the traversing portion and the heat sink, and the optical component, and that has a thermal conductivity higher in second directions, which cross the traversing portion in a plane orthogonal to first directions, than in the first directions, which are thickness directions of the wiring board.

7 Claims, 13 Drawing Sheets

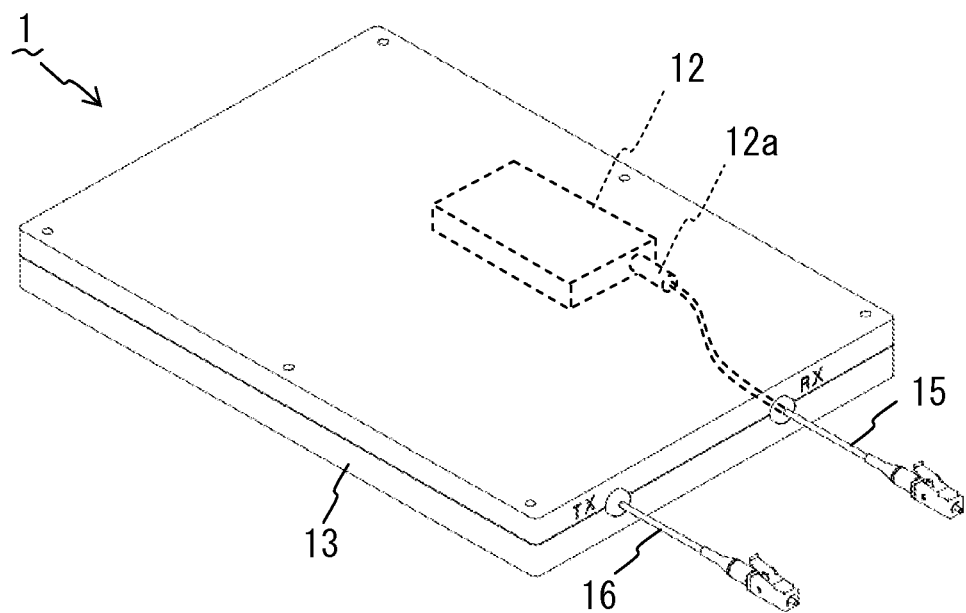
F I G. 1

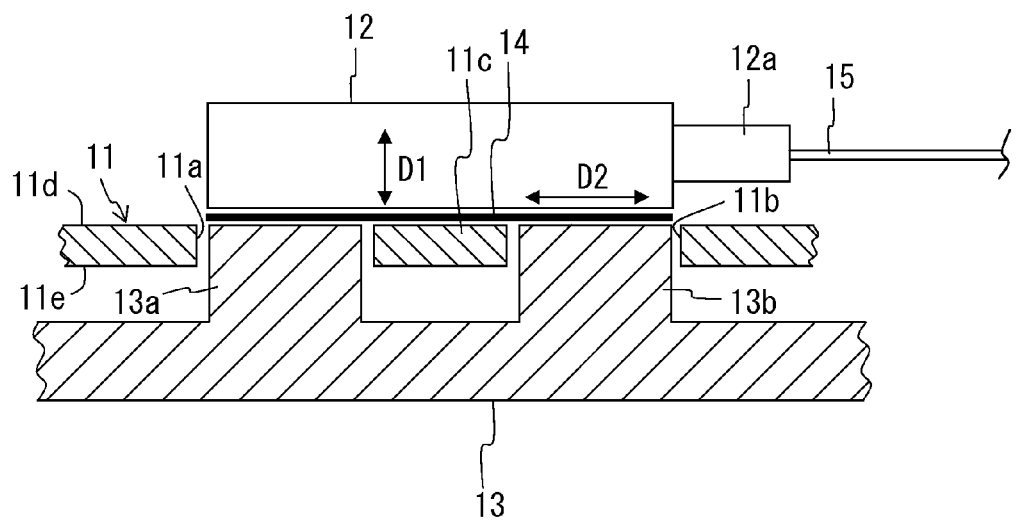
F I G. 2

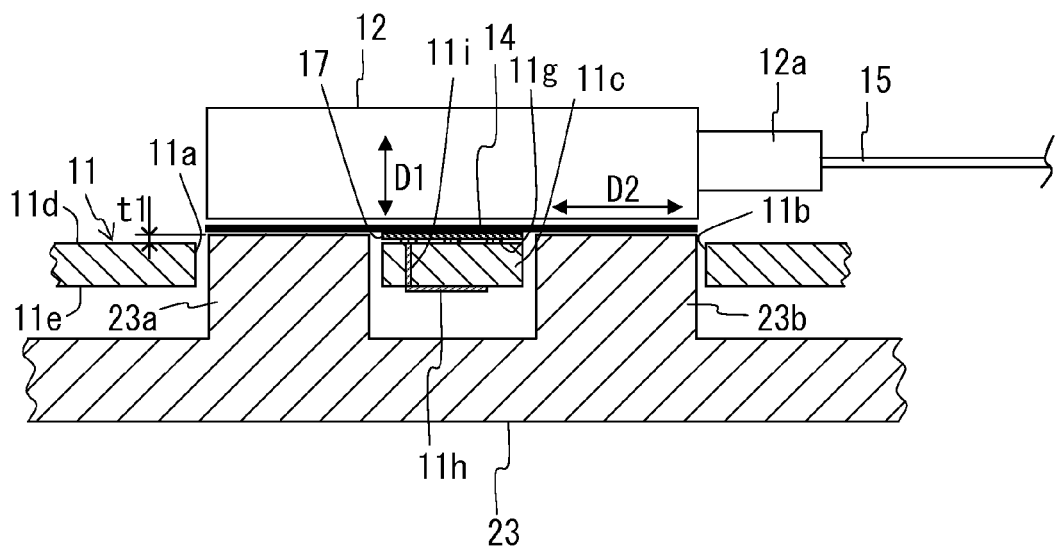
F I G. 5

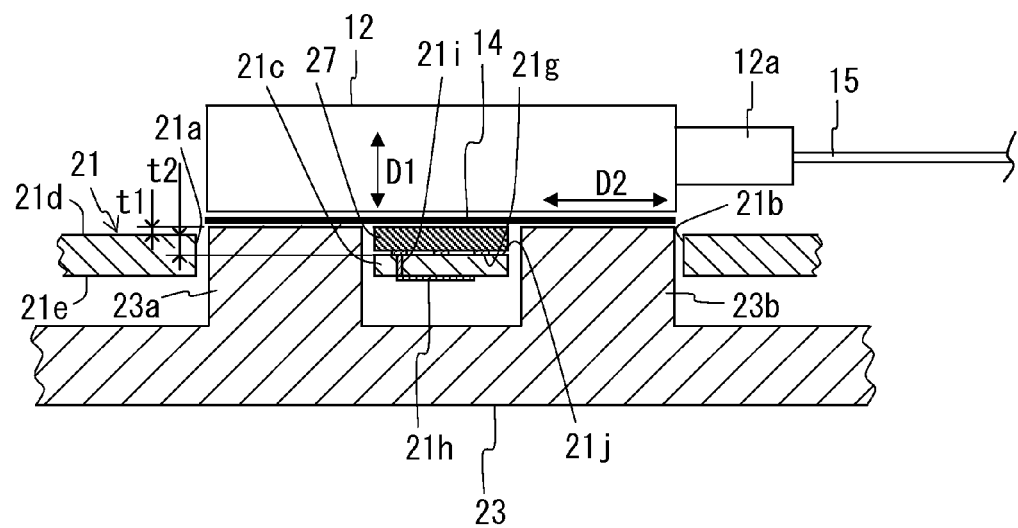
F I G. 6

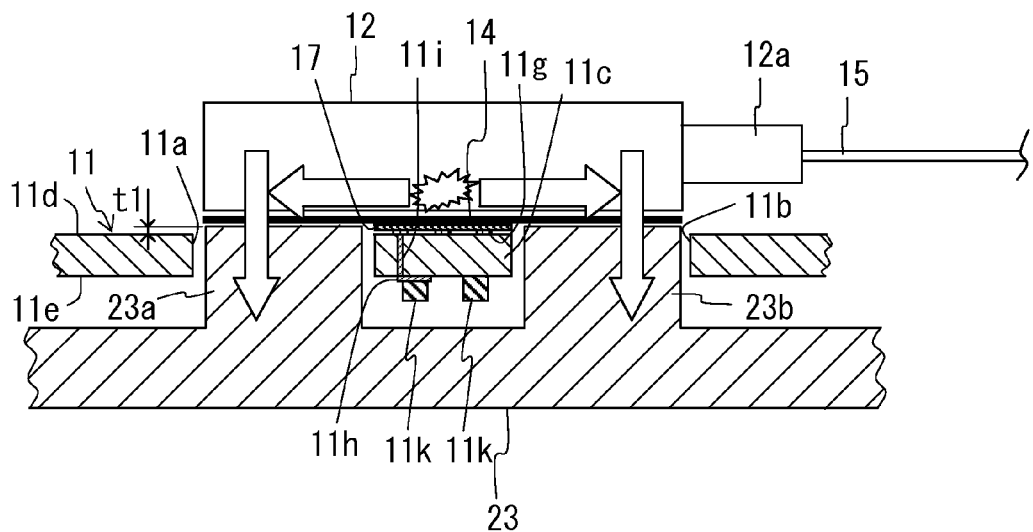
F I G. 8

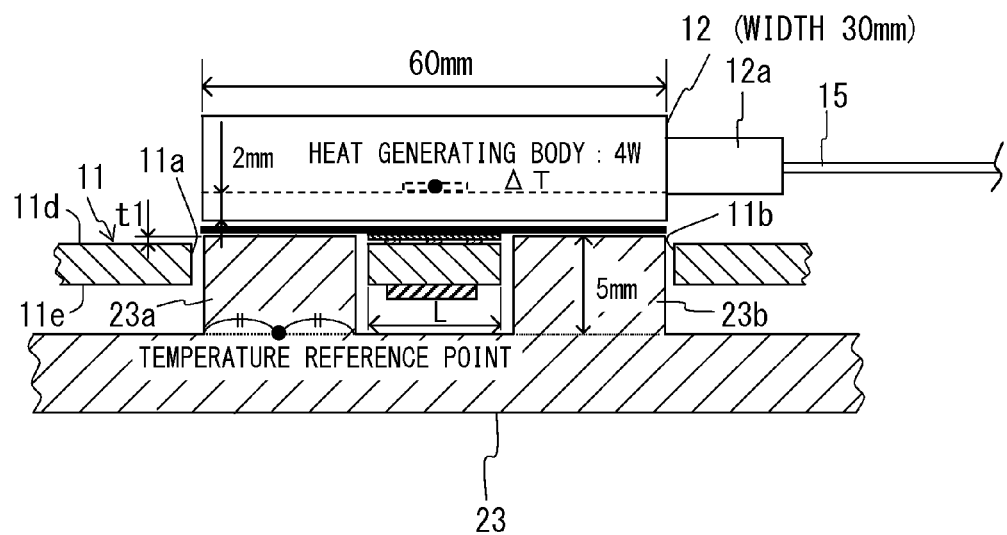
F I G. 9

OPTICAL MODULE

CROSS-REFERENCE TO RELATED APPLICATION

This application is based upon and claims the benefit of priority of the prior Japanese Patent Application No. 2012-267147 filed on Dec. 6, 2012, the entire contents of which are incorporated herein by reference.

FIELD

The embodiments discussed herein are related to an optical module including a wiring board and an optical component.

BACKGROUND

In recent years, accompanying the speeding up and sophistication of optical communications, optical modules used for optical communications have also advanced in speed and density. As the speeding up and density growth are accelerated, the difficulty in dissipating heat caused by increased power consumption and higher density has been becoming more unignorable than before.

At the same time, communication methods have been becoming complicated in order to realize high-speed optical communications. Partly because better characteristics can be attained by gathering modules for performing high-speed processes in one portion, optical components, represented mainly by high-speed optical components, that have a high performance and have complicated configurations have been developed. Such optical components are often large in size, and it is desirable to fully utilize large components that generate a large volume of heat in order to realize high speed communications. It is difficult to meet this demand, which is not consistent with the density growth.

As described above, the development of the optical transmission technology has increased the transmission volume of signals year by year. Against that background, modules that transmit and receive optical signals (optical modules) have been generating a larger amount of heat from a portion for converting optical signals into electric signals and processing them (optical reception component).

Today, standardization at the level of 100 Gbps is in progress; however, there is a large optical component of 60 mm×41 mm according to an industry standard (OIF-DPC-RX-01.0) discussed by the Optical Internetworking Forum (OIF). Such an optical component often varies its optical characteristics depending upon temperature, and generates a very large volume of heat.

Accordingly, in order to maintain the optical characteristics, the ability to dissipate heat is important. The above industry standard partially specifies heat dissipation; however, this is because components at the current technology level often generate heat in specified parts particularly and it is a specification from the viewpoint of priority, and there is a possibility that the heat generation at the center portion will become relatively intense.

A wiring board has a signal wire directed to the lead portion for the connection with a lead pin that is disposed in the lateral direction of an optical component. Accordingly, as a configuration of a wiring board, a configuration having a large notch and an opening is known (see Patent Document 1, for example).

It is a widely accepted practice to bring a large optical component into close contact with a case that has received precision flattening and to fix the component on it with a screw so that heat is dissipated from the flat bottom plane of the large optical component. Also, there is a large hole (opening) in a board so that a component that has to dissipate its heat can dissipate the heat to a heat sink (see Patent Document 2 for example). As described above, methods have been employed in which an optical component itself is wired to the wiring board while providing a large opening in a board so as to cause heat coupling between a large heat sink and the optical component.

Patent Document 1: Japanese Laid-open Patent Publication No. 07-30223
Patent Document 2: Japanese National Publication of International Patent Application No. 04-502385
Patent Document 3: Japanese Laid-open Patent Publication No. 2007-115868
Patent Document 4: Japanese Laid-open Patent Publication No. 2007-19130

SUMMARY

According to an aspect of the embodiments, an optical module includes a wiring board on which a first opening and a second opening are provided having, between the first and second openings, a traversing portion on which a signal wire is arranged, an optical component that is mounted on a first plane side of the first opening and the second opening of the wiring board and that generates heat, a heat sink arranged on a second plane side, which is on a reverse of the first plane side, of the first opening and the second opening of the wiring board, and an anisotropic heat dissipation sheet that is provided between the traversing portion and the heat sink, and the optical component, and that has a thermal conductivity higher in second directions, which cross the traversing portion in a plane orthogonal to first directions, than in the first directions, which are thickness directions of the wiring board.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a perspective view illustrating an example of an optical module;

FIG. 2 is a sectional view illustrating an internal structure of an optical module according to a first embodiment;

FIG. 5 is a sectional view illustrating an internal structure of an optical module according to a second embodiment;

FIG. 6 is a sectional view illustrating an internal structure of an optical module according to a third embodiment;

FIG. 8 is a sectional view illustrating directions of heat transfer according to the fourth embodiment;

FIG. 9 is a sectional view illustrating calculation conditions according to the fourth embodiment;

DESCRIPTION OF EMBODIMENTS

Figure 11:
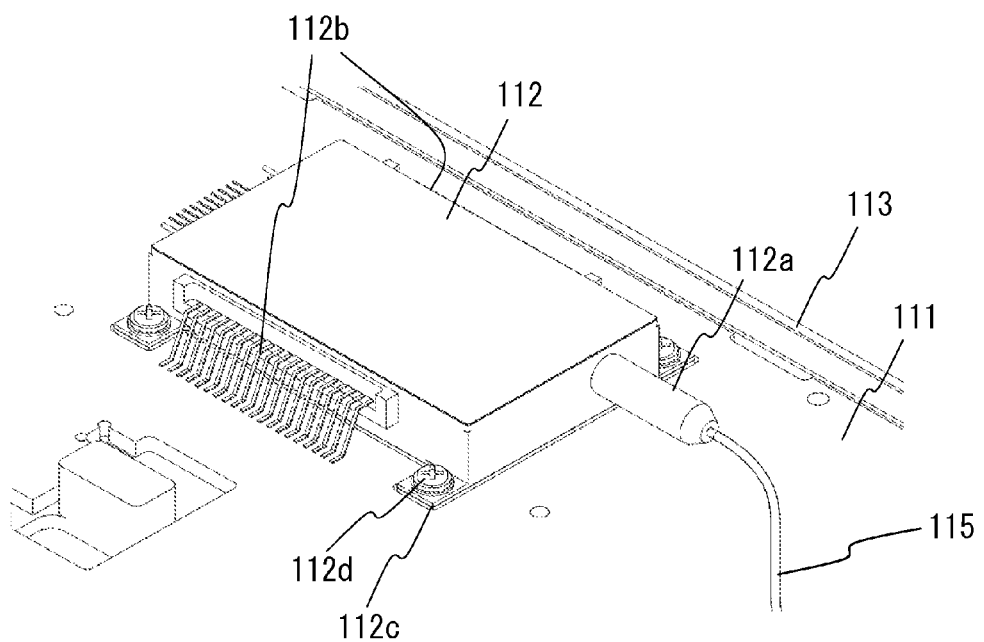
FIG. 11 is a perspective view illustrating an optical component of an optical module according to a referenced technique in a mounted state.

FIG. 11 is a perspective view illustrating an optical component 112 in amounted state of an optical module according to a referenced technique.

Figure 12:
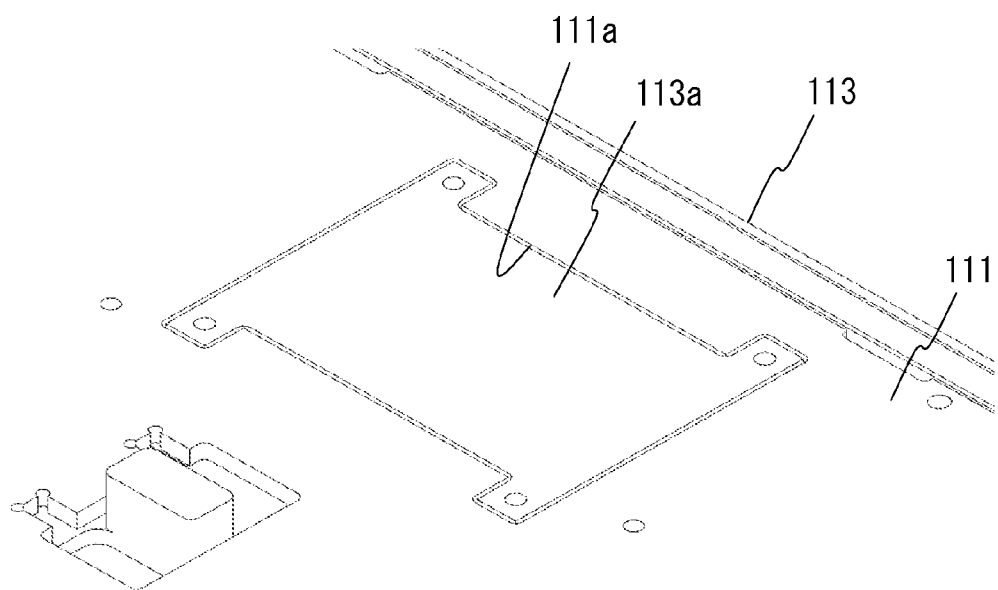
FIG. 12 is a perspective view illustrating a situation where the optical component of the optical module according to the referenced technique is not mounted.

FIG. 12 is a perspective view illustrating a situation where the optical component of the optical module according to the referenced technique is not mounted.

Figure 13:
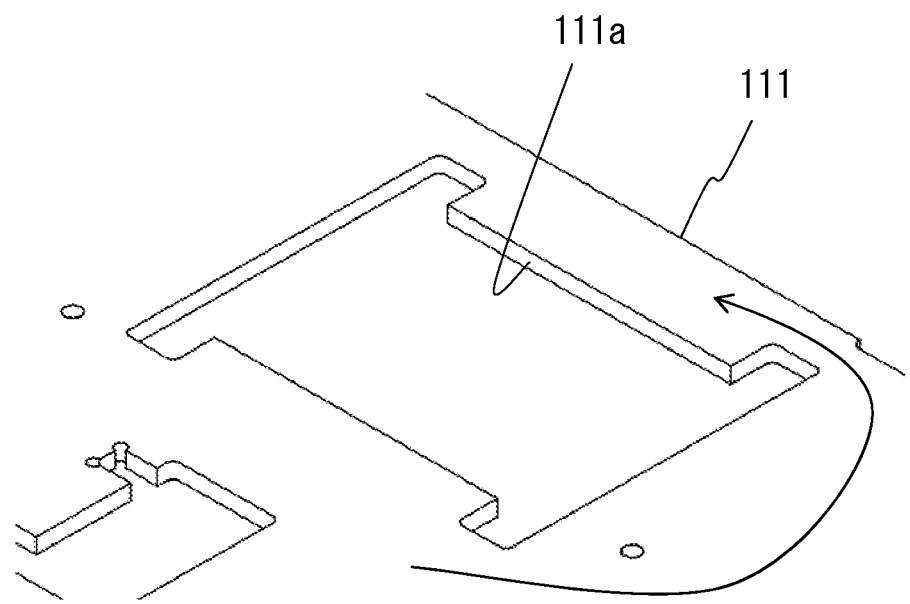
FIG. 13 is a perspective view illustrating a wiring board of the optical module according to the referenced technique.

FIG. 13 is a perspective view illustrating a wiring board 111 of the optical module according to the referenced technique.

As illustrated in FIG. 12 and FIG. 13, the wiring board 111 is provided with an opening 111a.

An optical fiber 115 is inserted into the optical component 112 illustrated in FIG. 11 via a rubber boot 112a.

Leads 112b of the optical component 112 are arranged in, for example, a bilaterally symmetric manner.

The optical component 112 is fixed to a case 113 on fringes 112c with screws 112d at the four corners.

As illustrated in FIG. 12, a projection part 113a that projects upward from the case 113 is inserted from below into the opening 111a of the wiring board 111. This makes the case 113 function as a heat sink.

The contact between the projection part 113a and the optical component 112 dissipates heat of the optical component 112 through the projection part 113a.

In this type of optical module, the large opening 111a is formed in the wiring board 111, imposing limitations on the designing of the wiring board 111. First, the component mounting space is restricted severely. In optical modules for which the reduction in the number of parts has become difficult because the advanced sophistication and the density growth has advanced further, reduction in the effective area for the wiring board 111 directly leads to failure of the mounting designing.

The large optical component 112 is expected to become further larger in years to come, and thus there is a demand that the area on which the case 113 (projection part 113a) and the large optical component 112 are in close contact be secured, the efficiency be reviewed, and the effective area for the wiring board 111 be secured while maintaining the heat dissipation performance.

When the optical component 112 is an optical reception component, it is arranged next to an optical transmission component in the wiring board 111, and it is usually arranged in a region close to an edge of the wiring board 111 as illustrated in FIG. 11.

The leads 112b from the optical component 112 are usually provided on both sides of the optical component 112. Accordingly, signals on the edge side of the wiring board 111 from among signals output from the lead 112b are transmitted on a route that bypasses the opening 111a as illustrated in FIG. 13.

Accordingly, there are many bypass wires, causing a problem to arise in which the designing for wiring of the wiring board 111 to the leads 112b is very difficult. Bypass wires have to pass through a region on the wiring board 111 that wires would otherwise not pass through, and naturally there are components and wires thereof in this region too. Bypass wires increase the wiring density of the bypass route and the difficulty of wiring, making it impossible to perform wiring in some cases. Also, the pattern length becomes longer because of bypass wires. Noise is involved in patterns more often, deteriorating the transmission quality of the patterns at large.

The large optical component 112 to be connected processes, at a high speed, signals having small amplitudes, and accordingly the noise involvement as described above may lead to a situation where the characteristics of a large optical component are not utilized sufficiently and instead, only its unstable characteristics emerge.

Aside from the above, there are conditions that are characteristic of the heat dissipation structure of the optical component 112. One is that stresses have to be made smaller. Stresses are applied for fixing components, and it is ideal that stresses be applied evenly to the plane that is to be fixed, which means that a structure that receives a strong stress locally is not easy to employ.

It is also difficult to employ heat-dissipating grease, heat-dissipating adhesive, or the like. It is difficult to remove adhesive, making repair operations etc. difficult. Heat-dissipating grease lacks in long-term reliability. When a lot of silicone oil is used, it tends to enter surrounding optical components including the optical component 112, often causing a decrease in the optical levels by polluting prisms or optical waveguides inside.

As described above, it is desirable to solve, at a high level while taking characteristics conditions into consideration, both the problem of the reduction in the effective area in the wiring board 111 and the problem about the heat dissipation, which is, from the beginning, the reason for providing a large notch.

Hereinafter, first through fourth embodiments will be explained.

First Embodiment

FIG. 1 is a perspective view illustrating an example of an optical module 1.

FIG. 2 is a sectional view illustrating an internal structure of the optical module according to the first embodiment.

Figure 3:
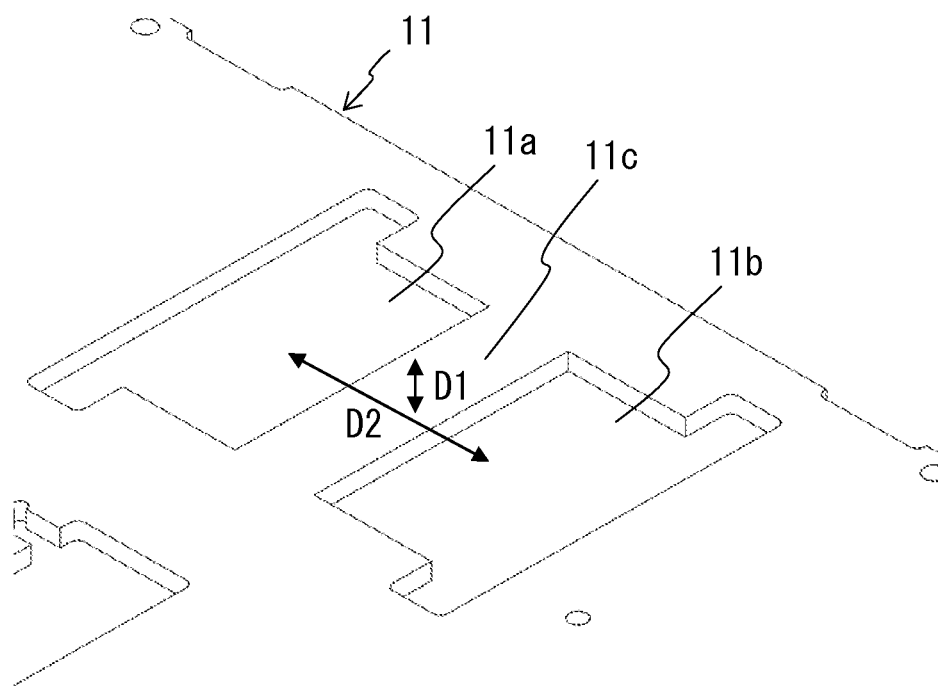
FIG. 3 is a perspective view illustrating a wiring board according to the first embodiment.

FIG. 3 is a perspective view illustrating a wiring board 11 according to the first embodiment.

As illustrated in FIG. 1, in the optical module 1, an optical component 12, which will be explained later, and the like are accommodated in a case 13, and a reception-side optical fiber 15 and a transmission-side optical fiber 16 are inserted into the case 13.

The optical module 1 illustrated in FIG. 1 is an example, and any components including the wiring board 11, the optical component 12, case 13, and an anisotropic heat dissipation sheet 14, which will be explained later, can be applied to the present embodiment.

As illustrated in FIG. 1 through FIG. 3, the optical module 1 includes the wiring board 11, the optical component 12, the case 13 as an example of a heat sink, and the anisotropic heat dissipation sheet 14.

As illustrated in FIG. 2 and FIG. 3, on the wiring board 11, a first opening 11a and a second opening 11b are provided having between them a traversing portion 11c on which signal wires are arranged. The number of dividing openings may be three or more; however, as the number of divisions increases, the area in contact with the case 13 decreases sharply, and the number is desirably two in view of securing the heat dissipation.

The optical component 12 is a component that generates heat, and is mounted on the side of a first plane 11d of the first opening 11a and the second opening 11b of the wiring board 11. The optical component 12 is, for example, an optical reception component. An optical fiber 15 on the reception side is inserted into the optical component 12 via a rubber boot 12a.

Similarly to the optical component 112 illustrated in FIG. 11, it is desirable that the optical component 12 include leads 112b arranged in, for example, a bilaterally symmetric manner, and that the optical component 12 be fixed to the case 13 with the screws 112d on the fringes 112c at the four corners.

As illustrated in FIG. 1 and FIG. 2, the case 13 accommodates the wiring board 11, the optical component 12, and the anisotropic heat dissipation sheet 14. The case 13 also functions as a heat sink that is provided on the side of the first opening 11a and a second plane 11e of a second opening 11b of the wiring board 11. The second plane 11e is a plane positioned on the reverse side from the first plane 11d.

The case 13 includes a first projection part 13a that projects while being inserted into the first opening 11a of the wiring board 11 and a second projection part 13b that projects while being inserted into the second opening 11b. In the present embodiment, the first projection part 13a and the second projection part 13b are integrated into the case 13.

The anisotropic heat dissipation sheet 14 is provided between the traversing portion 11c and the first and second projections 12a and 13b, and the optical component 12.

The anisotropic heat dissipation sheet 14 has a higher thermal conductivity in the second directions D2 than in first directions D1, which are the thickness directions of the wiring board 11, the second directions D2 crossing the traversing portion 11c in the plane that is orthogonal to the first directions D1. The second directions D2 are directions orthogonal to the longitudinal directions of the traversing portion 11c in embodiments. Note that the traversing portion 11c extends in a belt-like manner; however, the shape thereof is not limited particularly.

As an example of the anisotropic heat dissipation sheet 14, known sheets such as a graphite sheet, a sheet of a carbon nano tube, or the like may be used (For example, Japanese Laid-open Patent Publication No. 2007-019130 and Japanese Laid-open Patent Publication No. 2007-115868).

However, when there is a heat insulation layer on a heat dissipation path as in conventional techniques, it is not possible to connect the body of the optical component 12 to the signal ground (SG), weakening the effect of the ground, and therefore this configuration is not suitable for the heat dissipation of optical components that have to operate stably at high speeds.

The problem whereby the anisotropic heat dissipation sheet 14 having low thermal conductivity in the thickness directions is not capable of dissipating heat to the plane on the reverse side from the wiring board 11 only emerges when the anisotropic heat dissipation sheet 14 is extremely thick, and this problem may be ignored when a thin sheet is used such as a commercially available graphite sheet having a thickness of, for example, 0.1 mm or smaller because the resultant thermal resistance becomes low. The thermal resistance may be ignored also when the anisotropic heat dissipation sheet 14 has a thickness of 0.1 mm or greater, and it is exceptional that the anisotropic heat dissipation sheet 14 is not capable of dissipating heat to the plane on the reverse side from the wiring board 11, and thus excluding the thickness of several millimeters or greater as the thickness of the anisotropic heat dissipation sheet 14 is not intended.

However, it is desirable that the anisotropic heat dissipation sheet 14 be a sheet that is as thin as possible and that has thermal conductivity in the second directions D2 be about ten times as high as that in the first directions D1.

In order to reliably dissipate heat from the optical component 12 to the case 13, the wiring board 11 is pressed onto the optical component 12 so that the anisotropic heat dissipation sheet 14 is brought into close contact with the traversing portion 11c and the optical component 12.

Specifically, the top surfaces in the projection direction of the first projection part 13a and the second projection part 13b are on the same plane as the first plane 11d of the wiring board 11. When, for example, the first plane 11d of the wiring board 11 is set to be at a level that is, for example, 0.2 mm higher than the top surfaces in the projection direction of the first projection part 13a and the second projection part 13b, the contact between the traversing portion 11c and the optical component 12 can be improved due to the elasticity of the wiring board 11 because the wiring board 11 is at a level that is slightly higher.

However, when there is too great a height gap, there is a possibility that too strong a stress is applied locally, deteriorating the characteristics of the optical component 12. Accordingly, it is desirable that too great of a height gap not be created. The internal layers between the first plane 11d and the second plane 11e of the traversing portion 11c can be used as wiring regions so that the length of wires for the optical component 12 can be reduced.

Figure 4:
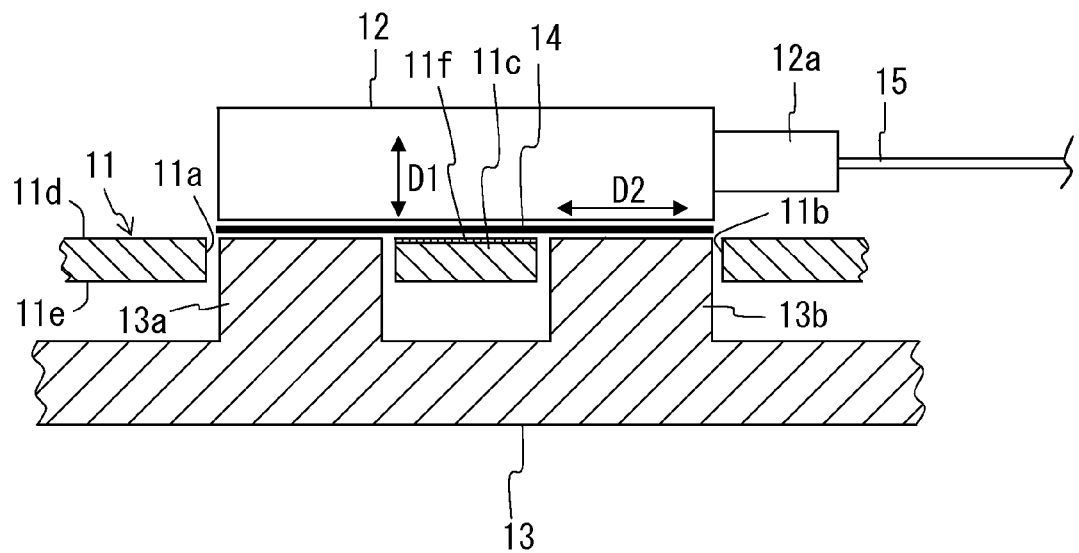
FIG. 4 is a sectional view illustrating an internal structure of an optical module according to a variation example of the first embodiment.

It is desirable that no patterns be made on the first plane 11d of the traversing portion 11c or that a wide-area pattern 11f that has the same potential as the body of the optical component 12 be disposed on the first plane 11d of the traversing portion 11c as illustrated in FIG. 4.

It is desirable that the first plane 11d of the traversing portion 11c be in close contact with the anisotropic heat dissipation sheet 14; however, the anisotropic heat dissipation sheet 14 often has a high electric conductivity and the body of the optical component 12 is often made of signal ground (SG).

In many cases, accordingly, by using the wide-area pattern 11f as the SG and omitting the application of solder resist, the SG of the optical component 12 can be reinforced. When the potential is different, a short circuit due to the difference in potential can be avoided by not making patterns on the first plane 11d of the traversing portion 11c, as illustrated in FIG. 2.

Also, on the portion where the anisotropic heat dissipation sheet 14 exists between the case 13 and the optical component 12, it is possible to make the potentials equal by bringing those members into close contact because of the electricity conductivity of the anisotropic heat dissipation sheet 14. It is desirable that the case 13 and the anisotropic heat dissipation sheet 14 entirely cover the first plane 11d of the traversing portion 11c and the top surfaces of the case 13 and the second projection part 13b and be in a size equal to or slightly smaller than the bottom area of the optical component 12 (the area of the plane facing the first plane 11d of the traversing portion 11c).

This is because there is a possibility that uncovered portions of the anisotropic heat dissipation sheet 14 touch surrounding electric devices to cause a short circuit due to the above described electric conductivity. It is ideal that the anisotropic heat dissipation sheet 14 cover the fringes 112c for the optical components 112 illustrated in FIG. 11 and that holes be made on the portions of the anisotropic heat dissipation sheet 14 through which the screws 112d pass. This structure is advantageous in respect of the reduction of stresses applied to the fringes 112c for the optical components 112 due to the height gap of about 0.2 mm, which is the thickness of the sheet.

When the second plane 11e of the traversing portion 11c does not have components mounted thereon, it is possible and desirable to raise the level of the portion of the case 13 that faces the second plane 11e of the traversing portion 11c so as to make the portion of the case 13 closer to the second plane 11e of the traversing portion 11c. This accelerates the heat dissipation toward the second directions D2 because the level of the portion of the case 13 facing the second plane 11e of the traversing portion 11c is higher while heat received from the top surfaces of the first projection part 13a and the second projection part 13b moves downward in FIG. 2. Because metals have an almost isotropic heat conductivity, the temperature decreases at the hot spot (the high temperature portion on the surface of the case 13 because of the thickness of the case 13). As a result, this contributes to a decrease in the temperature of the optical component 12.

It is also possible to employ a solution in which the first plane 11d of the traversing portion 11c is not brought into contact with the anisotropic heat dissipation sheet 14, the level of the top surfaces of the first projection part 13a and the second projection part 13b are made to be higher than the first plane 11d of the traversing portion 11c, and the anisotropic heat dissipation sheet 14 in the vicinity of the first plane 11d of the traversing portion 11c is adhered to the optical component 12 with heat dissipation grease, heat dissipation adhesive, or the like.

However, it is difficult to remove adhesive from the beginning, making it difficult to replace the anisotropic heat dissipation sheet 14 in repair operations, etc. Heat dissipation grease is not problematic in view of removal; however, it lacks long-term reliability because its heat dissipation characteristics are sometimes subject to change by the drying of silicone oil, and further when it contains much silicone oil, the silicone oil enters the optical component 12 around it, often causing a decrease in the optical levels by polluting prisms or optical waveguides inside. The absence of the necessity of heat dissipation grease and heat dissipation adhesive is one advantage of the present embodiment.

Note that the traversing portion 11c can be connected by a flexible board such as an FPC, which is different from other portions of the wiring board 11. However, the addition of a different material is disadvantageous in view of cost for materials or assembling, and also troublesome, decreasing the productivity. Accordingly, it is desirable that the traversing portion 11c be provided in such a manner that it is integrated with the wiring board 11.

In the above described embodiment, the first opening 11a and the second opening 11b are provided having, between them, the traversing portion 11c on which a signal wire is arranged. The optical component 12 is mounted on the side of the first plane 11d of the first opening 11a and the second opening 11b of the wiring board 11, and generates heat. A heat sink, exemplified by the case 13, is provided on the side of the second plane 11e, which is on the reviser side from the side of the first plane 11d of the first opening 11a and the second opening 11b of the wiring board 11. The anisotropic heat dissipation sheet 14 is provided between the traversing portion 11c and the heat sink (case 13) and the optical component 12, and has a higher thermal conductivity in the second directions D2 than in the first directions D1, which is the thickness direction of the wiring board 11, the second directions D2 crossing the traversing portion 11c in the plane that is orthogonal to first direction D.

This makes it possible to provide a signal wire on the traversing portion 11c and to prevent the influence of noise that would be caused when signal wires bypass the openings. Also, the anisotropic heat dissipation sheet 14 can conduct, to the side of the case 13, heat that is propagating to the traversing portion 11c from the optical component 12, which will be explained in detail in the fourth embodiment. Accordingly, the present embodiment can increase the resistance property of signal wires against noise while suppressing the reduction in heat dissipation efficiency.

It is also possible to eliminate bypass wires without greatly reducing spaces for mounting components of the wiring board 11. Also, the wiring density of the wiring board 11 decreases, which can decrease the difficulty of designing. It is also possible to reduce the length of patterns on the wiring board 11 by eliminating bypass wires. Thereby, it is possible to suppress the reduction in the effective area of the wiring board 11 and to solve the problem of heat dissipation, which is the reason for providing a large opening from the beginning.

Also, in the present embodiment, a heat sink, exemplified by the case 13, includes the first projection part 13a, which is inserted into the first opening 11a of the wiring board 11, and the second projection part 13b, which is inserted into the second opening 11b of the wiring board 11. This facilitates the heat conductance from the optical component 12 to the case 13, leading to a suppression of the reduction in the heat dissipation efficiency.

Also, in the present embodiment, the top surfaces in the projection direction of the first projection part 13a and the second projection part 13b are on the same plane as the first plane 11d of the wiring board 11. This can bring the anisotropic heat dissipation sheet 14 into close contact with the optical component 12, the traversing portion 11c, the first projection part 13a, the second projection part 13b, and the like in a simple configuration, leading to the suppression of the reduction in heat dissipation efficiency.

In the present embodiment, the heat sink is the case 13 that accommodates the wiring board 11, the optical component 12, and the case 13. Accordingly, it is possible to suppress the reduction of the heat dissipation reliably by a simple configuration.

Second Embodiment

FIG. 5 is a sectional view illustrating an internal structure of an optical module according to a second embodiment.

The present embodiment is different from the above first embodiment in that a first projection part 23a and a second projection part 23b of a case 23, which is an example of a heat sink, project from the first plane 11d of the wiring board 11 after passing through the first opening 11a and the second opening 11b, and that an insulation sheet 17, which is an example of a sheet-shaped member, is disposed between the traversing portion 11c and the anisotropic heat dissipation sheet 14, and these embodiments are roughly similar to each other in other respects. Accordingly, detailed explanations will be omitted.

The insulation sheet 17 is pasted on the first plane 11d of the traversing portion 11c. A first plane side pattern 11g is provided to the first plane 11d of the traversing portion 11c. The insulation sheet 17 is, for example, polyimide heat-resistant tape, etc., and is for example approximately 0.07 mm in thickness. The insulation sheet 17 is provided on the first plane side pattern 11g, and thus it is possible to estimate the total thickness of the insulation sheet 17 and the first plane side pattern 11g to be about 0.1 mm.

Accordingly, when a thickness t1 of the projecting portions of the first projection part 23a and the second projection part 23b of the case 23 above the first plane 11d of the wiring board 11 is similarly about 0.1 mm, the anisotropic heat dissipation sheet 14 and the traversing portion 11c (insulation sheet 17) can be brought into close contact with each other.

Note that polyimide heat-resistant tape is an example, and other materials having an electricity insulation property can be used as the insulation sheet 17.

Some types of the anisotropic heat dissipation sheet 14 include an insulation sheet or an insulation film pasted thereon. The insulation property of these sheets can be used as the insulation sheet 17; however, this naturally means that insulating objects are on the first projection part 23a and the second projection part 23b of the case 23, increasing the thermal resistance.

When taking the contact into consideration, it is desirable that a sheet-shaped member (insulation sheet 17) be an elastic sheet, and a thermal resistance material having cushioning characteristics (elasticity) is the best selection. An alternative example is an insulative thin silicone heat dissipation sheet. A silicone heat dissipation sheet is suitable as an alternative to heat-resistant tape because of its thermal resistance against 100° C. or higher and softness.

The reactive force of a member having cushioning characteristics when it is being pressed increases gradually in accordance with the pushing-up dimension. When the dimension tolerance is taken into consideration, the reactive force to the optical component 12 can be reduced, and it is a configuration recommended to be used in the present embodiment, in which stresses are applied locally from the traversing portion 11c to the optical component 12.

Also, a sheet-shaped member, exemplified by the insulation sheet 17, can reduce the downward distortion of the traversing portion 11c in FIG. 5. This is true regardless of whether the sheet-shaped member is elastic or not.

Also, some types of the wiring board 11 have insulative solder resist applied thereon, and when the electric insulation property of the solder resist is perfect, it may be used in place of the insulation sheet 17. However, as a general rule, solder resist has problems in its insulation property and strength, and it is better to paste an insulation sheet on solder resist.

In the present embodiment, the insulation sheet 17 has to be prepared as an additional member; however, the electric insulation of the first plane 11d of the traversing portion 11c can be secured, making it possible to use the first plane 11d of the traversing portion 11c as a wiring region.

Also, a through hole 11i and an interstitial via hole (IVH) are provided for the connection between wire layers between the first plane side pattern 11g and a second plane side pattern 11h of the traversing portion 11c, and an annular ring is provided on the first plane 11d.

When the insulation sheet 17 is not provided such as in the first embodiment, it is not possible, in order to prevent short circuit, to provide an annular ring on the first plane 11d, and accordingly it is practically impossible to connect between layers. By contrast, the present embodiment uses the insulation sheet 17, making it possible to connect between layers.

This makes it possible to make wires cross each other in the wiring board 11, dramatically enhancing the degree of freedom in designing. It is better to set the portion facing the second plane 11e of the traversing portion 11c of the case 23 to be at a high level as long as a short circuit with the second plane side pattern 11h is not caused. It is best to set the above facing portion of the case 23 to be at the limit of the mechanical height level to contact the insulation sheet 17 by also pasting the insulation sheet 17 to the second plane 11e of the traversing portion 11c.

For the same configuration as that in the first embodiment, the above second embodiment can attain the same effect as that attained by the configuration of the first embodiment, i.e., the enhancement of the noise resistance of signal wires while suppressing the reduction in the heat dissipation efficiency, etc.

Also, according to the present embodiment, the first projection part 23a projects from the first plane 11d of the wiring board 11 after passing through the first opening 11a and the second projection part 23b projects from the first plane 11d of the wiring board 11 after passing through the second opening 11b. Accordingly, it is possible to provide a space between the traversing portion 11c of the wiring board 11 and the optical component 12. This makes it possible to provide to the space the insulation sheet 17, an elastic sheet, or a sheet-shaped member such as a sheet having the properties of both of them.

Also, according to the present embodiment, a sheet-shaped member exemplified by the insulation sheet 17 is disposed between the traversing portion 11c and the anisotropic heat dissipation sheet 14. Accordingly, it is possible to prevent the traversing portion 11c from being distorted.

Also, the present embodiment employs the insulation sheet 17 as a sheet-shaped member, and this leads to a higher degree of freedom in designing, permitting the provision of the first plane side pattern 11g on the first plane 11d of the traversing portion 11c, the provision of the through hole 11i on the traversing portion 11c, etc.

Also, the present embodiment can reduce the reactive force applied from the traversing portion 11c to the optical component 12 when a sheet-shaped member is an elastic sheet.

Third Embodiment

FIG. 6 is a sectional view illustrating an internal structure of an optical module according to a third embodiment.

The present embodiment is different from the above second embodiment in that a traversing portion 21c of a wiring board 21 is formed at a level lower than a first plane 21d, and is roughly similar to the first and second embodiments in other respects. Accordingly, detailed explanations will be omitted.

The wiring board 21 according to the present embodiment includes, similarly to the wiring board 11 of the second embodiment, a first opening 21a, a second opening 21b, a traversing portion 21c, a first plane 21d, a second plane 21e, a first plane side pattern 21g, a second plane side pattern 21h, and a through hole 21i.

Further, the traversing portion 21c of the wiring board 21 has a recess 21j (the depth is t2) that is open to the side of the wiring board 21 and that is formed on, for example, the entirety of the traversing portion 21c. Thereby, the traversing portion 21c is formed at a position lower than the first plane 21d.

Note that in the present embodiment, similarly to the second embodiment, the first projection part 23a and the second projection part 23b of the case 23 project from the first plane 21d of the wiring board 21 (the thickness of the projecting portion is t1); however, it is possible to employ a configuration where, similarly to the first embodiment, they do not project.

An insulation sheet 27 (which is an example of a sheet-shaped member) according to the present embodiment is, for example, an insulation silicone sheet, and is thicker than the insulation sheet 17 of the second embodiment. Accordingly, the insulation sheet 27 tends to cause wrinkles on the anisotropic heat dissipation sheet 14. When the anisotropic heat dissipation sheet 14 is fixed with wrinkles on it, the anisotropic heat dissipation sheet 14 becomes prone to bending or breakage.

Accordingly, it is ideal that there be no height differences between the surface of the insulation sheet 27 and the top surfaces of the first projection part 23a and the second projection part 23b. In order to realize this, the recess 21j is formed over the entire traversing portion 21c and the traversing portion 21c has a reduced thickness.

Also, some types of the wiring board 21 have insulation solder resist applied thereon; however, the present embodiment assumes that a thick insulation sheet is pasted on the solder resist.

The above third embodiment can attain the same effect as that attained by the configurations of the first and second embodiments, i.e., the enhancement of the noise resistance of signal wires while suppressing the reduction in the heat dissipation efficiency, etc.

Also, in the present embodiment, the traversing portion 21c is formed at a level lower than the first plane 21d of the wiring board 21. Accordingly, it is possible to provide a space between an optical component 22 and the traversing portion 21c of the wiring board 21. This makes it possible to provide to the space the insulation sheet 27, an elastic sheet, or a sheet-shaped member such as a sheet having the properties of both of them.

Fourth Embodiment

Figure 7:
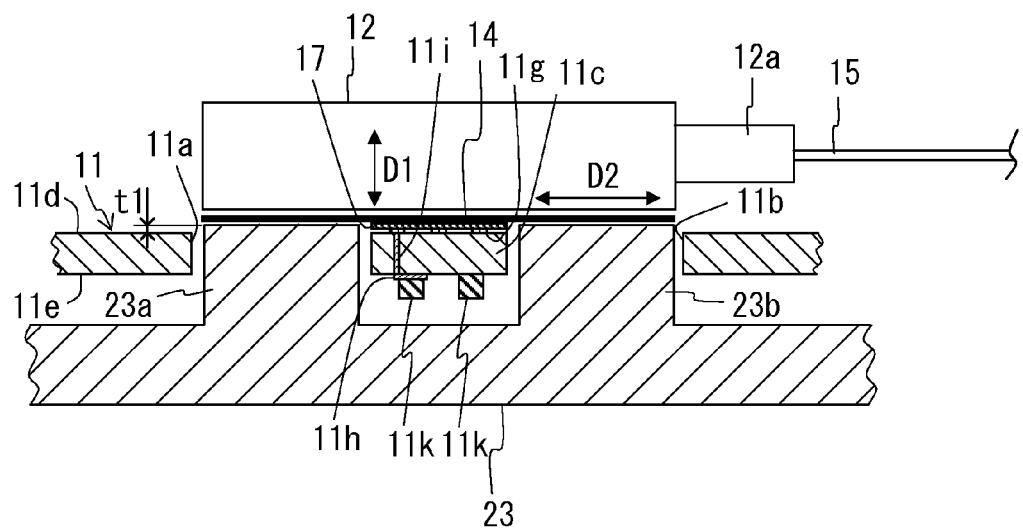
FIG. 7 is a sectional view illustrating an internal structure of an optical module according to a fourth embodiment.

FIG. 7 is a sectional view illustrating an internal structure of the optical module according to the fourth embodiment.

The present embodiment is different from the above second embodiment in that an electronic component 11k is mounted on the second plane 11e of the traversing portion 11c and this electronic component 11k is electrically connected to the first plane side pattern 11g, which is a wire provided on the first plane 11d of the traversing portion 11c, and these embodiments are roughly similar to each other in other respects. Accordingly, detailed explanations will be omitted.

As illustrated in FIG. 7, the traversing portion 11c has, similarly to the second embodiment, the first plane side pattern 11g, the second plane side pattern 11h and the through hole 11i formed thereon, and the electronic component 11k is provided on the second plane 11e of the traversing portion 11c.

In the present embodiment, because the electronic component 11k is electrically connected to the first plane side pattern 11g, it is desirable in view of maintaining insulation that the insulation sheet 17 illustrated in FIG. 7 or the insulation sheet 27 of the third embodiment exist between the traversing portion 11c and the anisotropic heat dissipation sheet 14 (optical component 12).

FIG. 8 is a sectional view illustrating directions of heat transfer according to the fourth embodiment.

FIG. 9 is a sectional view illustrating calculation conditions according to the fourth embodiment.

Figure 10:
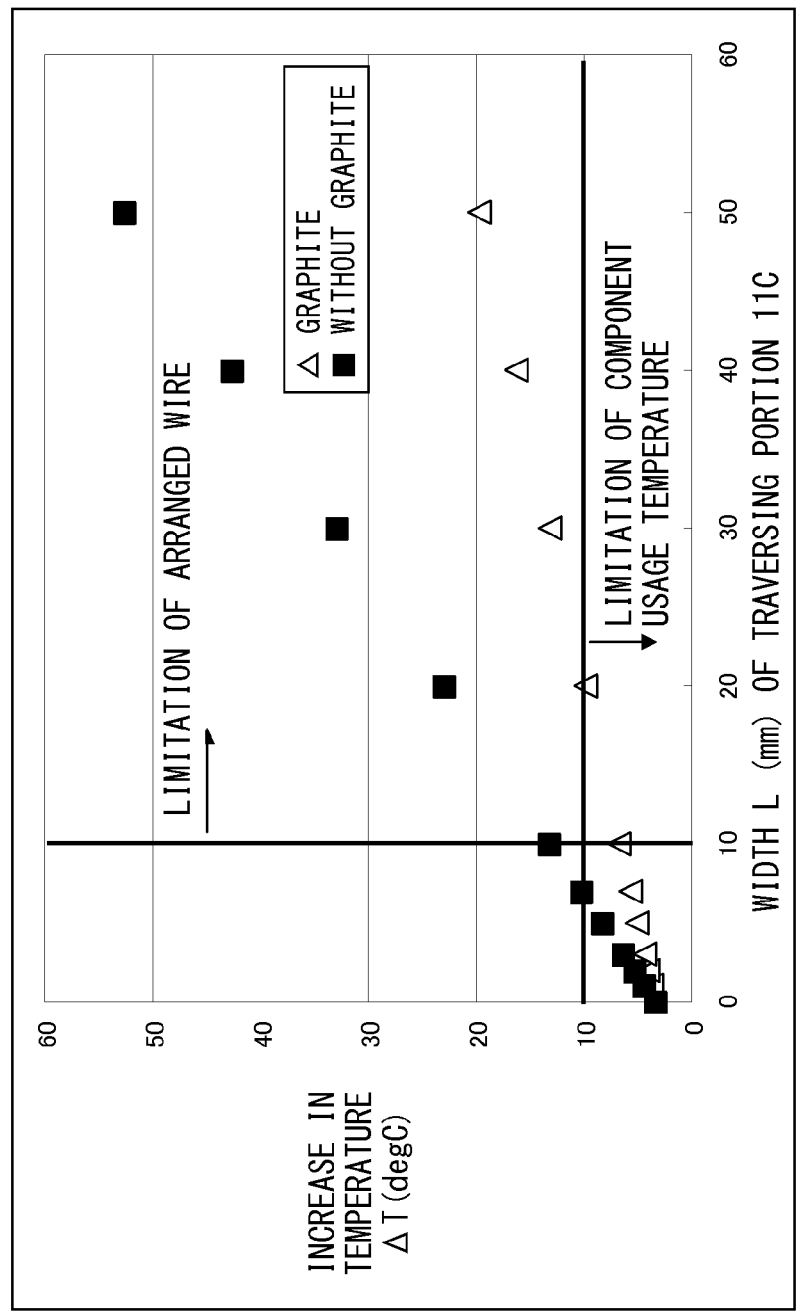
FIG. 10 illustrates relationships between a width of the intersection portion and temperature increase.

FIG. 10 illustrates a relationship between width L of the traversing portion and temperature increase $\Delta t$ according to the fourth embodiment.

The thermal conductivity of the anisotropic heat dissipation sheet 14 illustrated in FIG. 8 is approximately 7 W/mK in the first directions D1, which are the thickness directions of the wiring board 11 illustrated in FIG. 7, and is approximately 700 W/mK in the second directions D2 that are crossing the traversing portion 11c in the plane orthogonal to the first directions D1 (actually they are identical in the plane orthogonal to the first directions D1) in the case of, for example, a graphite sheet, and is very advantageous in view of the thermal transfer in the second directions D2.

The anisotropic heat dissipation sheet 14 does not have such an excellent thermal conductivity in the first directions D1, however, it has a small thickness of approximately 0.10 mm from the beginning, and accordingly its thermal resistance is suppressed to approximately 0.03° C./W. In FIG. 8 the heat dissipation from the portion of the optical component 12 facing the traversing portion 11c to the portion contacting the case 23 is represented by arrows. As illustrated in the figure, the heat in the position of the optical component 12 facing the traversing portion 11c is conducted to the first opening 11a and the second opening 11b via the anisotropic heat dissipation sheet 14, and thereafter is conducted to the first projection part 23a and the second projection part 23b.

Here, explanations will be given for calculation conditions in the fourth embodiment.

The case 23 is made by a cutting process performed on aluminum or a die-cast molding of aluminum. It is desirable that the flatness of the top surfaces of the heat dissipation surfaces, which are the top surfaces of the first projection part 23a and the second projection part 23b, be taken into consideration in the designing because the flatness has an influence on the contact with the optical component 12.

When the case 23 is made of aluminum, it will have a thermal conductivity of approximately 150 W/mK through 237 W/mK; however, because it has an isotropic thermal conductivity, heat is not dissipated well through a portion having a thickness of about 1 mm. Accordingly, the case 23 is designed to have a large thickness even around the portion contacting the optical component 12.

The optical component 12 is an integrated reception device according to OIF-DPC-RX-01.0; however, the optical component 12 can be applied to other optical components having highly similar configurations such as a Tunable Laser Diode (LD).

The body of an integrated reception device is made of kovar, which is not greatly influenced by changes in shape caused by heat. However, its characteristics are influenced by distortion of torque caused by a tightening of screws, and when the flatness of the contacting portion is low, a great distortion will be caused by the tightening of screws. It is desirable that special consideration be given to the attaching methods and tightening torque.

The wiring board 11 is made of an FR4 material, which has an excellent high-speed characteristic. The thickness is about 2 mm. In recent years, regarding FR4-related materials, the specific permittivity of glass cloth has become remarkably lower and the property of the dielectric tangent has become remarkably better, which makes it suitable for the wiring board 11 of an optical module.

On the traversing portion 11c, the recess 21j illustrated in FIG. 6 is not formed, and the number of layers in the traversing portion 11c is the same as that of other portions of the wiring board 11. The wiring board 11 has two openings, i.e., the first opening 11a and the second opening 11b, and the traversing portion 11c serves as a bridge around the center.

The through hole 11i is provided as a pattern of the traversing portion 11c and there are also patterns on internal layers and on both of the top layers (the first plane side pattern 11g and the second plane side pattern 11h). The insulation sheet 17 used for the insulation between the anisotropic heat dissipation sheet 14 and the traversing portion 11c is Kapton tape (polyimide tape) having a thickness of about 0.07 mm. Thereby, the side of the first plane 11d of the traversing portion 11c is insulated entirely. Also, the wiring board 11 has solder resist applied thereon by using a pre-flux process; however, Kapton tape is used for the insulation because there is a possibility that the solder resist will be peeled by the contact with the optical component 12.

The anisotropic heat dissipation sheet 14 is a graphite sheet as described above. A graphite sheet is a sheet produced by carbonizing a polyimide sheet, and has a thermal conductivity of about 700 W/mK in the plane direction (in the plane orthogonal to the first directions D1, i.e., the directions including the second directions D2) due to the carbon molecular binding in the plane directions, and has a thermal conductivity of about 7 W/mK in the thickness directions (the first directions D1). The thickness is about 0.1 mm with the handling being taken into consideration. The shape is identical to the bottom surface of the optical component 12, and the fringe 112c as illustrated in FIG. 11 is also brought into contact. Accordingly, through holes are provided on the graphite sheet so that the first planes 11d pass through them at the four positions.

The effects of the present embodiment can be reviewed easily. Large scale calculations such as simulation are not necessary. First, the thermal resistance is calculated from the thermal conductivity, the area and length of the heat conducting path, and they are studied as a combined resistance of all pieces of heat resistance.

The thickness of the bottom plate of the optical component 12 is 2 mm, and there is a heat generating body. The width of the traversing portion 11c (the second directions D2) is L. With L is center symmetric, and all the other portions are fixed to the case 23 of the aluminum with screws. It is assumed that the thermal conductivity of the case 23 is 237 W/mK (the calculation is based on an assumption that the aluminum is pure aluminum) and the thermal conductivity of the optical component 12 is 17 W/mK. The thickness of the GS (graphite sheet) is 0.1 mm. Treating the heat reference point as the temperature reference point illustrated in FIG. 9, the difference in temperature between this temperature reference point and the heat generating body is defined as $\Delta T$. The temperature difference $\Delta T$ is set to be 10° C. or lower as a design requirement.

There is a design requirement also for width L of the traversing portion 11c. When width L is too small, it is not possible to mount components on the bottom surface of the traversing portion 11c, which is problematic. Width L is 10 mm or greater, including the wiring regions around the electronic component 11k. The heat generating body is 4 W, and is mounted at the center of the optical component 12.

When there is graphite as the anisotropic heat dissipation sheet 14, it is possible to suppress temperature increases $\Delta T$ with respect to width L of the traversing portion 11c as represented by the plot of the white triangles in FIG. 10 in comparison with the plot of the black squares, which represents the case where there is no graphite as the anisotropic heat dissipation sheet 14.

It is only when there is graphite and width L is 10 mm through 20 mm that the condition that width L is 10 mm or wider and the temperature increase $\Delta T$ is 10° C. or lower is met as the above design condition.

By setting width L of the traversing portion 11c to be 20 mm in the designing of the wiring board 11, an FET or a large A/D converter that are connected with the pins of the optical component 12 can be disposed. These components are mounted on the side not facing the optical component 12, i.e., are mounted on the second plane 11e of the traversing portion 11c. Because it is desirable to use the through hole 11i for wiring, the above Kapton tape is used as the insulation sheet 17.

The wiring board 11 has, for example, sixteen layers, and it is possible to perform wiring by using wide-area patterns on six of the layers for the connection with the above described SG, FET, and large A/D converter and to use all the other layers except for the top and the bottom layers, i.e., eight of the layers, for wiring for the connection with pins of the optical component 12. Due to the effect of the graphite sheet (the anisotropic heat dissipation sheet 14), width L can be as large as 20 mm, drastically improving the degree of freedom in designing.

As described above, at the designing stage, the high density of wires at the first opening 11a, the second opening 11b, and the ends of the wiring board 11 illustrated in FIG. 3 is eliminated, making it possible to perform wiring on shorter routes. Also, during the reviewing of heat, it is possible to confirm that the temperature is within the rated temperature of a device. It is possible to confirm that the wiring aspect and heat dissipation aspect are compatible with each other.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An optical module, comprising:
a wiring board on which a first opening and a second opening are provided having, between the first and second openings, a traversing portion on which a signal wire is arranged;
an optical component, mounted on a side of a first plane of the first opening and the second opening of the wiring board, that generates heat;
a heat sink arranged on a side of a second plane, which is on a reverse of the side of the first plane, of the first opening and the second opening of the wiring board; and
an anisotropic heat dissipation sheet, provided between the traversing portion and the heat sink, and the optical component, having a thermal conductivity higher in traversing directions than in thickness directions of the wiring board, the traversing directions crossing the traversing portion in a plane orthogonal to the thickness directions,
wherein:
the heat sink accommodates, as a case of the optical module, a whole of the wiring board, the optical component, and the anisotropic heat dissipation sheet;
the heat sink includes a first projection part inserted into the first opening of the wiring board and a second projection part inserted into the second opening of the wiring board;
the first projection part projects from the first plane of the wiring board after passing through the first opening; and
the second projection part projects from the first plane of the wiring board after passing through the second opening.

2. The optical module according to claim 1, wherein the traversing portion is formed at a level lower than the first plane of the wiring board.

3. The optical module according to claim 1, wherein top surfaces of the first projection part and the second projection part in a projection direction are on the same plane as the first plane of the wiring board.

4. The optical module according to claim 1, further comprising a sheet-shaped member disposed between the traversing portion and the anisotropic heat dissipation sheet.

5. The optical module according to claim 4, wherein:
the sheet-shaped member is an insulation sheet.

6. The optical module according to claim 4, wherein:
the sheet-shaped member is an elastic sheet.

7. The optical module according to claim 1, wherein a component electrically connected to a wire provided on the first plane of the traversing portion is mounted on the second plane of the traversing portion.

* * * * *